(12) United States Patent
Zhan (10) Patent No.: US 10,648,152 B2
(45) Date of Patent: May 12, 2020

(54) BOX-TYPE PIPELINE WITH CIRCUMFERENTIAL OBTUSE ANGLE CONNECTION

(71) Applicant: NANJING LIANZHONG CONSTRUCTION ENGINEERING TECHNOLOGY CO., LTD, Nanjing (CN)

(72) Inventor: Fujun Zhan, Nanjing (CN)

(73) Assignee: NANJING LIANZHONG CONSTRUCTION ENGINEERING TECHNOLOGY CO., LTD, Nanjing (JP)

( * ) Notice: Subject to any disclaimer, the term of this patent is extended or adjusted under 35 U.S.C. 154(b) by 19 days.

(21) Appl. No.: 16/083,447

(22) PCT Filed: Nov. 30, 2016

(86) PCT No.: PCT/CN2016/107897
§ 371 (c)(1),
(2) Date: Sep. 7, 2018

(87) PCT Pub. No.: WO2018/028087
PCT Pub. Date: Feb. 15, 2018

(65) Prior Publication Data
US 2019/0071838 A1   Mar. 7, 2019

(30) Foreign Application Priority Data
Aug. 9, 2016   (CN) .......................... 2016 1 0649976

(51) Int. Cl.
*F16L 9/00* (2006.01)
*E02D 29/045* (2006.01)
*F16L 9/06* (2006.01)

(52) U.S. Cl.
CPC ............ *E02D 29/045* (2013.01); *F16L 9/003* (2013.01); *F16L 9/06* (2013.01); *E02D 2200/12* (2013.01);
(Continued)

(58) Field of Classification Search
CPC ... F16L 9/003; F16L 9/02; F16L 9/006; F16L 9/22; F16L 9/17; E02D 2200/12;
(Continued)

(56) References Cited

U.S. PATENT DOCUMENTS

2,017,058 A * 10/1935 Freeze ................... B21D 13/04
                                                                    138/100
3,638,434 A *  2/1972 Delaere ................... E01F 5/005
                                                                    405/126
(Continued)

*Primary Examiner* — Patrick F Brinson
(74) *Attorney, Agent, or Firm* — CBM Patent Consulting, LLC (57) ABSTRACT

A box type duct with circumferential obtuse angle connection. Unit plates respectively located on the upper, lower and two side surfaces are spliced in the circumferential direction to form a unit pipe section, and the unit pipe sections are spliced in the axial direction to form a box type duct; wherein the unit plate is an arc-shaped corrugated plate arched to the outside of the box type duct, and the adjacent unit plates form an obtuse angle of circumferential connection. The cross section of the duct is in an approximately rectangular box shape, so the utilization ratio of clearance of the duct is high; the unit plate adopts an arc-shaped structure, and by utilizing the pipe-soil joint stressing principle, the strength and bearing capacity of the overall structure are maximized; and the box type duct adopts flat flange or angle steel flange connection in the circumferential direction.

10 Claims, 11 Drawing Sheets

(52) U.S. Cl.
CPC .............. *E02D 2200/1642* (2013.01); *E02D 2300/0032* (2013.01); *E02D 2600/20* (2013.01)

(58) Field of Classification Search
CPC .... E02D 2200/1642; E02D 2300/0032; E02D 2600/20; H02G 3/0418
USPC .............. 138/121, 155, 120, 172, 173, 159; 403/271; 405/124; 285/424
See application file for complete search history.

(56) References Cited

U.S. PATENT DOCUMENTS

| | | | | |
|---|---|---|---|---|
| 3,681,925 | A * | 8/1972 | Schmunk | E02B 11/005 |
| | | | | 405/49 |
| 4,605,338 | A * | 8/1986 | Peterson | E01F 5/005 |
| | | | | 138/105 |
| 7,740,731 | B2 * | 6/2010 | Leontaridis | B29C 65/342 |
| | | | | 156/292 |
| 9,290,895 | B2 * | 3/2016 | Cormier | E01F 5/005 |

* cited by examiner

BOX-TYPE PIPELINE WITH CIRCUMFERENTIAL OBTUSE ANGLE CONNECTION

TECHNICAL FIELD

The present invention discloses a box type duct, and particularly relates to a box type duct with circumferential obtuse angle connection.

BACKGROUND ART

Figure 16:
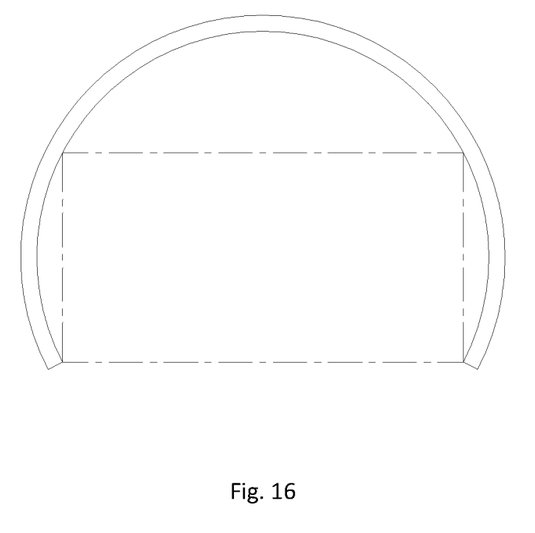
FIG. 16 is a structural schematic view of internal clearance of an arched duct in the prior art.
Figure 17:
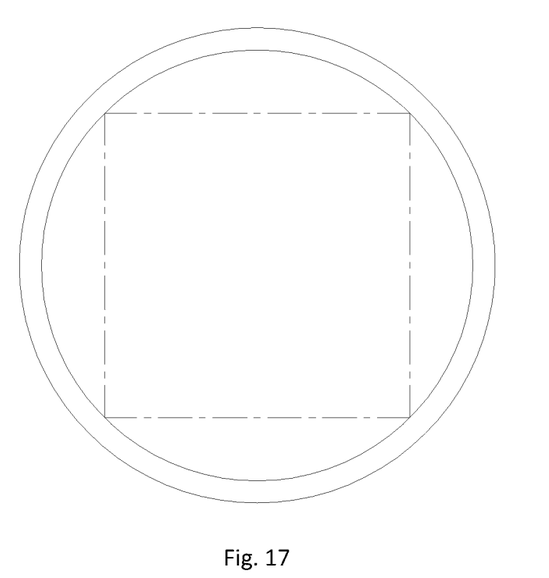
FIG. 17 is a structural schematic view of internal clearance of a circular duct in the prior art.
Figure 18:
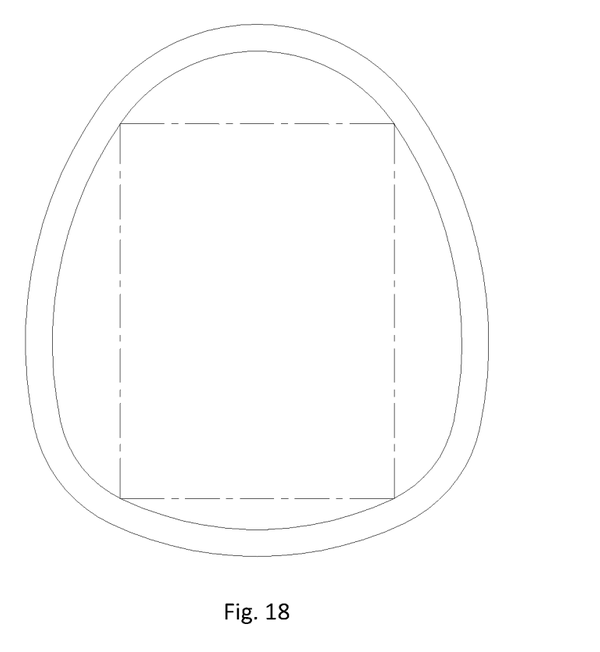
FIG. 18 is a structural schematic view of internal clearance of an elliptical duct in the prior art.

Steel corrugated steel pipes for highways, generally in the shape of a circle, an ellipse, a horseshoe or an arch, etc., all adopt an arc-shaped plate structure, so as to ensure the strength of the overall structure by utilizing the pipe-soil joint stressing principle when the structure is stressed. Regardless of whether the unit plates for constituting the unit pipe sections have the same center, the same radius, or multiple centers and multiple radii, the circumferential connection of the unit plates adopts an arc-shaped transition instead of connection by means of forming an obtuse angle between the plates. As shown in FIG. 16 to FIG. 18, in ordinary ducts of which the cross-sectional shape is generally circular, elliptical, horseshoe-shaped or arched, etc., the ordinary arc-shaped transition pipe culvert has the defects of low utilization ratio of the internal clearance, a great waste of space and high top chord height, result in increasing the earthwork excavation amount. However, in some cases where there is a specific requirement for the utilization ratio of the internal clearance of the duct, such as the corridor structure of the urban underground integrated pipe gallery and the culvert allowing passage of vehicles therefrom, it is necessary to make the cross section an approximately rectangular box shape to ensure the utilization ratio of clearance of the duct; and it is also necessary to use the pipe-soil joint stressing principle to ensure the overall strength, facilitate construction and accelerate the construction progress, so the traditional cross-section form and connection method cannot meet the requirements.

Therefore, it is urgent to solve the above technical problems.

SUMMARY OF THE INVENTION

Object of the Invention: the object of the present invention is to provide a box type duct with circumferential obtuse angle connection, which has the advantages of maximized utilization ratio of internal clearance and cross section and high pipe wall strength, and can quickly implement duct splicing and simplify the production procedure.

Technical Solution: according to a box type duct with circumferential obtuse angle connection, unit plates respectively located on the upper, lower and two side surfaces are spliced in the circumferential direction to form a unit pipe section, and the unit pipe sections are spliced in the axial direction to form a box type duct; wherein the unit plate is an arc-shaped corrugated plate arched to the outside of the box type duct, and the adjacent unit plates form an obtuse angle of circumferential connection.

When the unit plates are spliced in the circumferential direction, contact ends of the adjacent unit plates are provided with connecting flanges, and the adjacent connecting flanges are splicing connection surfaces. The circumferential connection portion of the adjacent unit plates adopts a non-arc transition connection form and a non-right angle connection form, but is connected by an obtuse angle connection between the unit plate and the unit plate.

Preferably, the connecting flange is a flat flange or an angle steel flange.

Further, the angle steel flange comprises a pair of L-shaped plates, one sides of the pair of L-shaped plates contact each other, and the other sides are respectively connected with the adjacent unit plates.

Further, when the unit plates are spliced in the circumferential direction, the adjacent connecting flanges are connected through a circumferential connection structure, the circumferential connection structure comprises a connecting plate bent at an angle, a reinforcing rib is disposed on the inner side of the connecting plate, and a triangular inner cavity is formed between the reinforcing rib and the connecting plate.

Furthermore, the bending angle of the connecting plate is an acute angle. The superior pressure bearing capacity of the combination of the acute angle connecting plate and reinforcing rib is utilized to reduce manufacturing costs, implement standardized production, and further enhance the stress strength of the overall structure.

Preferably, the connecting plate is provided with connecting holes for circumferential connection, and the connecting plate and connecting flange are connected through bolts to implement the connection between the adjacent unit plates. In the splicing process, the circumferential connection structure can realize a certain positioning function, thereby facilitating the circumferential connection of the adjacent unit plates in the mounting process and implementing quick mounting.

Further, the connecting plate is provided with circulation holes for pouring concrete. When the concrete needs to be poured after the splicing of the spliced duct is completed, in order to achieve the communication between the plates and the integrity of the concrete, the connecting plate is provided with circulation holes in the corresponding positions to implement the circulation of the concrete, so that a continuous hollow cavity structure is formed and spliced to form pipe sections, thereby further enhancing the vertical pressure bearing capacity of the duct.

Preferably, the unit plates have at least one curvature.

Furthermore, the corrugated plate is formed by a metal plate, and the metal plate is bent to form protrusions; or the metal plate is bent to form protruded shapes, and a plate or pipe is combined with the protrusions to form a hollow cavity structure; or the corrugated plate is spliced from a metal plate and a metal pipe; or a C-shaped steel, channel steel, I-beam, arc-shaped steel, angle steel or corrugated plate is fastened with the metal plate to form a hollow cavity structure.

Further, the inside of the hollow cavity is filled with concrete, or the inside of the hollow cavity is provided with steel bars and filled with concrete.

Preferably, the inner wall of the unit pipe section is provided with steel bars, embedded parts or hooks for arranging pipelines or hoses.

Furthermore, when the unit pipe sections are spliced in the axial direction, a rigid connection structure spanning adjacent pipe sections is disposed at axial edges of the adjacent unit pipe sections, and the rigid connection structure comprises a pair of fixing plates that are oppositely fastened to the edges of the unit pipe sections.

The rigid connection structure can effectively prevent the adjacent units from being deformed or detached by pulling during axial splicing in practical engineering.

Compared with the prior art, the present invention has the following beneficial effects:

(1) the cross section of the duct is in an approximately rectangular box shape, so the utilization ratio of clearance of the duct is high; the unit plate adopts an arc-shaped structure, and by utilizing the pipe-soil joint stressing principle, the strength and bearing capacity of the overall structure are maximized;

(2) the curvature of the unit plate of the present invention can be free from the limit of the diameter and span of the duct; unlike the spliced steel corrugated pipe with a circular cross section, the curvature of the unit plate is completely related to the diameter of the duct, and affects the selection of the wave height and wave pitch of the unit plate;

(3) the four obtuse angle connection structures of the unit pipe section of the present invention solve the problem that the diameter of the curling circle cannot be too small when the wave height of the corrugated plate is large; the non-arc transition of the four connection angles can use the corrugated plate with very large wave height to enhance the inertia moment of the corrugated plate, so that the diameter of the pipe section can be made very large;

(4) the box type duct adopts the flat flange or angle steel flange connection in the circumferential direction, and the length of each section can be made to more than 10 m, so the overall construction progress is greatly accelerated; especially when adopting the angle steel flange connection, the stress in the corner stress concentration area is greatly improved, thereby avoiding the phenomenon of pipe structure damage due to the welding cracking of the single welding connection form of the connecting flange and the unit plate under the dynamic load condition;

(5) the circumferential connection structure is used as a limit when mounting the duct, thereby preventing the top plate from sliding left and right and ensuring the safety of the mounting process; and (6) under the condition of ensuring the same utilization ratio of clearance and load, no arc transition plate is needed for connection between plates, so that the steel thickness and cross section arc length of the duct can be reduced, thereby saving the cost, being more beneficial to accelerating the construction progress of the construction site, and bringing in huge economic benefit and social benefit.

DETAILED DESCRIPTION OF THE INVENTION

The technical solution of the present invention will be further described below with reference to the accompanying drawings.

Figure 3:
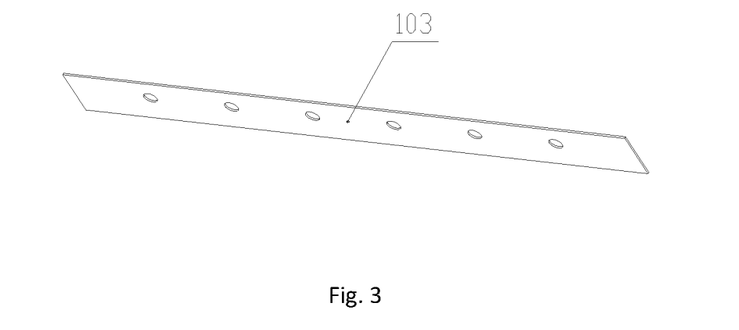
FIG. 3 is a structural schematic view of a flat flange in the present invention.
Figure 6:
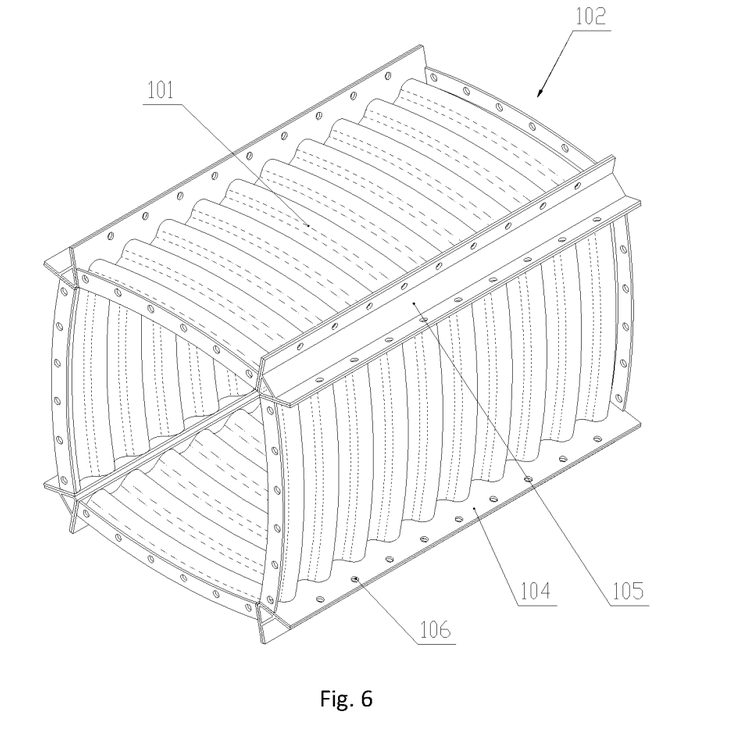
FIG. 6 is a structural schematic view of a box type duct with a circumferential connection structure according to the present invention.
Figure 7:
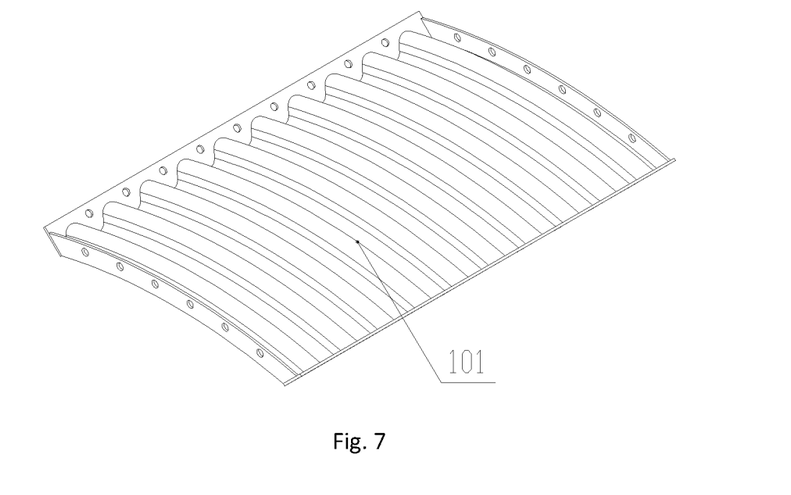
FIG. 7 is a structural schematic view of a unit plate connected by a flat flange in the present invention.
Figure 8:
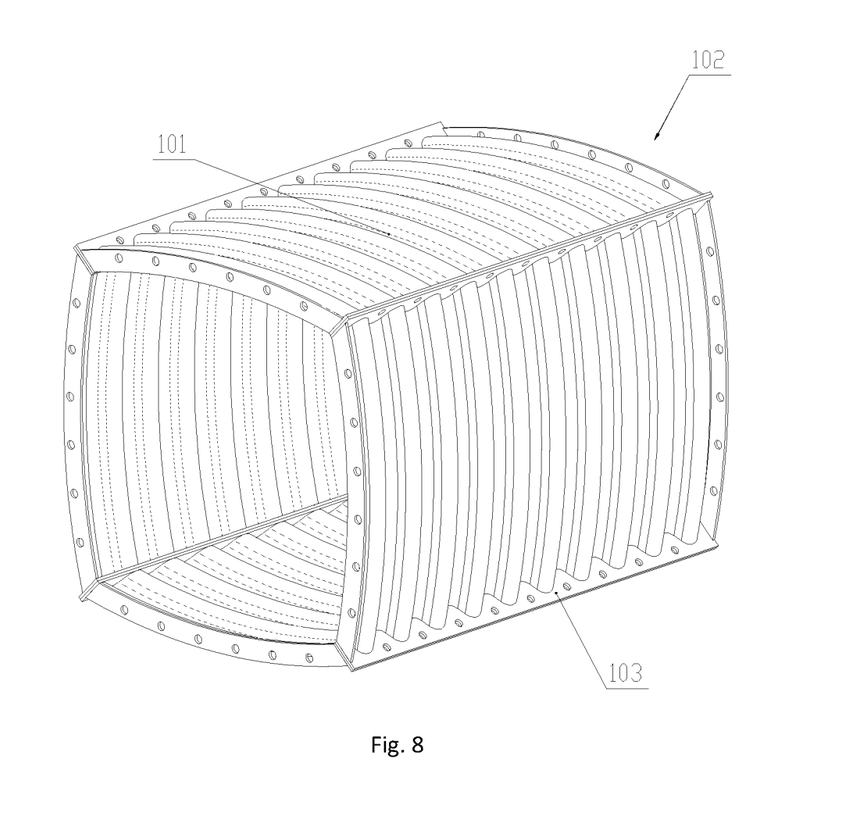
FIG. 8 is a structural schematic view of a box type duct using flat flange connection in the present invention.
Figure 10:
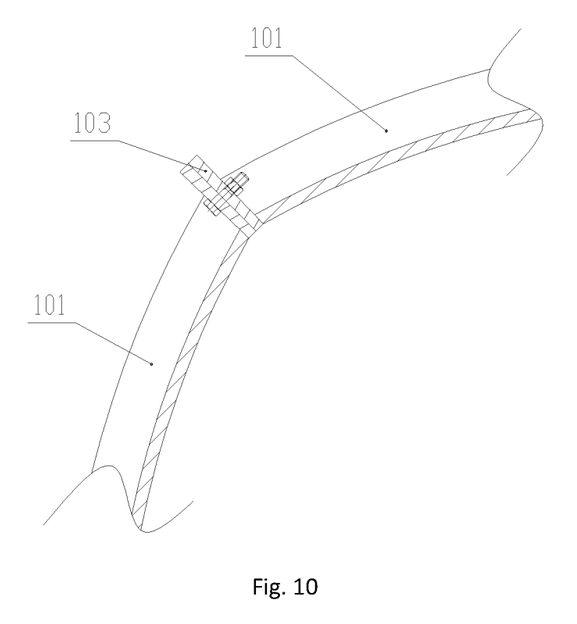
FIG. 10 is a partial schematic view of a corner in case of flat flange connection.
Figure 11:
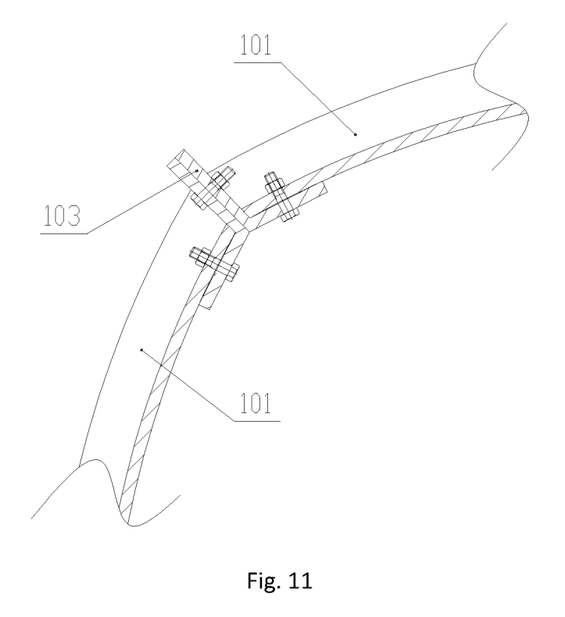
FIG. 11 is a partial schematic view of a corner in case of angle steel flange connection.

As shown in FIG. 6 and FIG. 8, according to the box type duct with circumferential obtuse angle connection in the present invention, unit plates 101 respectively located on the upper, lower and two side surfaces are spliced in the circumferential direction to form a unit pipe section 102, and the unit pipe sections 102 are spliced in the axial direction to form the box type duct; the unit plate 101 is an arc-shaped corrugated plate arched to the outside of the box type duct, the corrugated lines are perpendicular to the axis of the box type duct, and the adjacent unit plates 101 form an obtuse angle of circumferential connection; wherein when the unit plates 101 are spliced in the circumferential direction, contact ends of the adjacent unit plates 101 are provided with connecting flanges 103, and the adjacent connecting flanges 103 are splicing connection surfaces; as shown in FIG. 3, wherein the connecting flange 103 is a flat flange or an angle steel flange; and the circumferential splicing surfaces of the unit plate 101 and the connecting flange 103 are provided with circumferential connection holes, thus implementing quick connection through bolts, so the mounting is convenient, and the construction progress is greatly accelerated, as shown in FIG. 10. The flange face of the flat flange and the arc surface of the unit plate form an angle, as shown in FIG. 7 and FIG. 10. The angle steel flange is an L-shaped plate, and one side surface of the L-shaped plate and the unit plate 101 are connected with each other through bolts; wherein when the unit plates 101 are spliced in the circumferential direction, the adjacent L-shaped plates are connected with each other through bolts, as shown in FIG. 11. The box type duct adopts the flat flange or angle steel flange connection in the circumferential direction, so the overall construction progress is greatly accelerated; and especially when adopting the angle steel flange connection, the stress in the corner stress concentration area is greatly improved, thereby avoiding the phenomenon of pipe structure damage due to the welding cracking of the single welding connection form of the connecting flange and the unit plate under the dynamic load condition.

The unit plates 101 respectively located on the upper, lower and two side surfaces in the present invention have at least one curvature, and the four unit plates may be plates having the same curvature, and may also be plates with two, three or four different curvatures. The corrugated plate is formed by a metal plate, and the metal plate is bent to form protrusions; or the metal plate is bent to form protruded shapes, and a plate or pipe is combined with the protrusions to form a hollow cavity structure; or the corrugated plate is spliced from a metal plate and a metal pipe; or a C-shaped steel, channel steel, I-beam, arc-shaped steel, angle steel or corrugated plate is fastened with the metal plate to form a hollow cavity structure. The inside of the hollow cavity is filled with concrete, or the inside of the hollow cavity is provided with steel bars and filled with concrete. The corrugated height value and cross section inertia moment of the corrugated plate of the duct of the present invention can be very high, thereby avoiding the problem that the duct cannot be easily bent into the required curvature when the diameter of the duct is smaller or the radius of the arc transition section is small; and thus, the curvature of the plate is not limited by the diameter and span of the duct any more, thereby providing convenience for production and manufacturing.

The circumferential connection portions of the adjacent unit plates adopt a non-arc transition connection form and a non-right angle connection form, but is connected by an obtuse angle connection between the unit plate and the unit plate.

Figure 12:
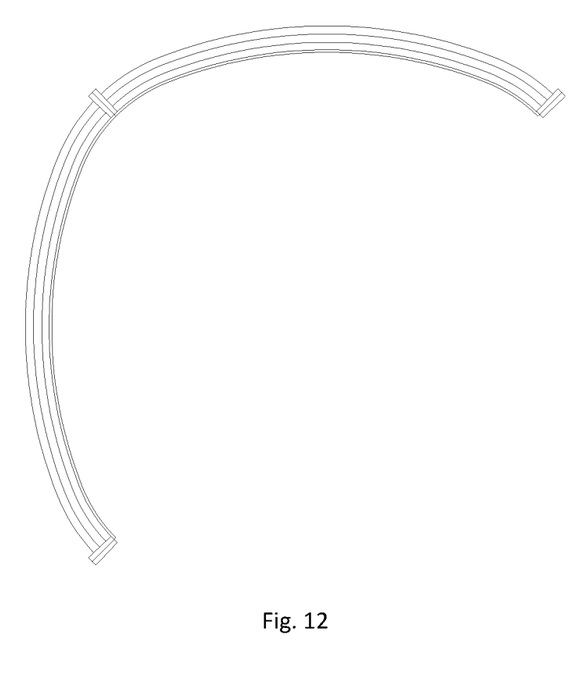
FIG. 12 is a structural schematic view of an arc transition connection form in the prior art.
Figure 13:
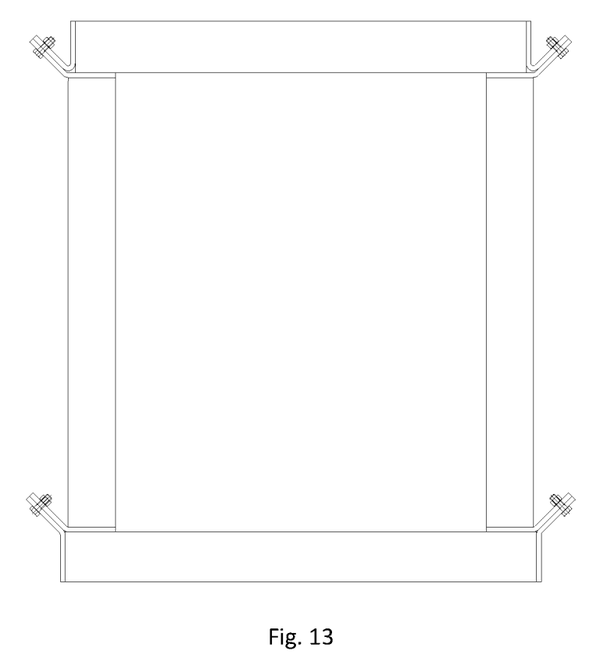
FIG. 13 is a structural schematic view of a right angle transition connection form in the prior art.

As shown in FIG. 12, the traditional arc transition connection form has higher requirements for the manufacturing and processing technique, and has high requirements for the consistency of arcs of the adjacent unit plates, otherwise it is difficult for mounting. More importantly: when the corrugation height is large and the diameter of the duct is smaller or the radius of the arc transition section is smaller, it is difficult to bend into the required curvature, thereby limiting the use of the corrugated plate with large wave height and large inertia moment. The direction of the stress of the duct in the arc transition connection form is the circumferential direction of the plate. As shown in FIG. 13, the right angle connection form cannot utilize the pipe-soil joint stressing principle, the transmission of the upper load through the joint is completely born by the columns at two side, so the requirement for the bearing capacity of the columns is extremely high.

Figure 14:
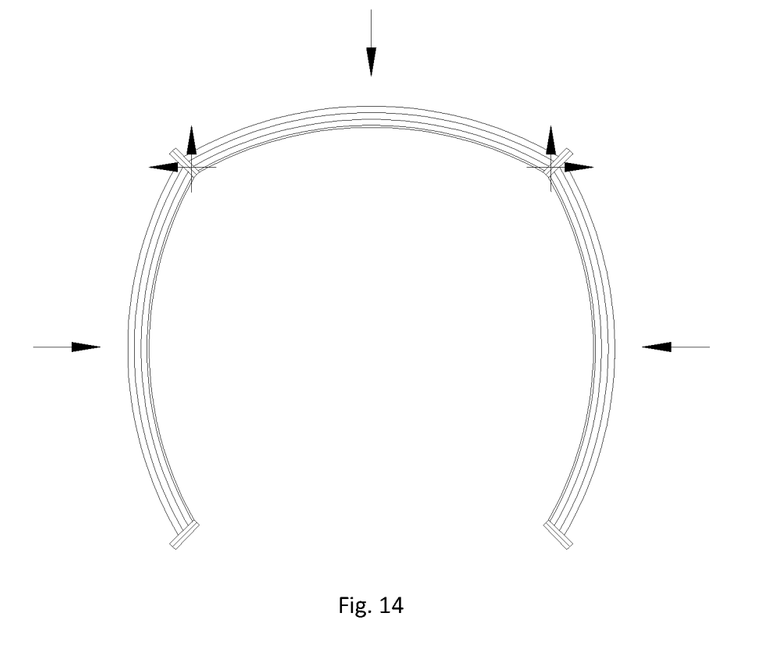
FIG. 14 is a stress schematic view of an obtuse angle connection form in the present invention.

As shown in FIG. 14, the direction of the stress of the plates in the angle connection form of the present invention is also the circumferential direction of the plates; however, since the obtuse angle connection is used instead of the arc transition joint, the direction of the stress of the connecting corner, as shown in FIG. 14, and the extrusion of the side backfilling earth to the top plate enable the side plates at the connecting corner to have a large uplifting force component on the top plate, thereby reducing the upper load pressure born by the top plate. Similarly, the vertical pressure of the top plate enables the top plate to have large side thrust on the side plates at the connecting corner, thereby reducing the side load pressure born by the top plate, which indicates that the side plate load and the top load can partially cancel each other under such connection structure, so that the overall structure is more reasonable.

Figure 5:
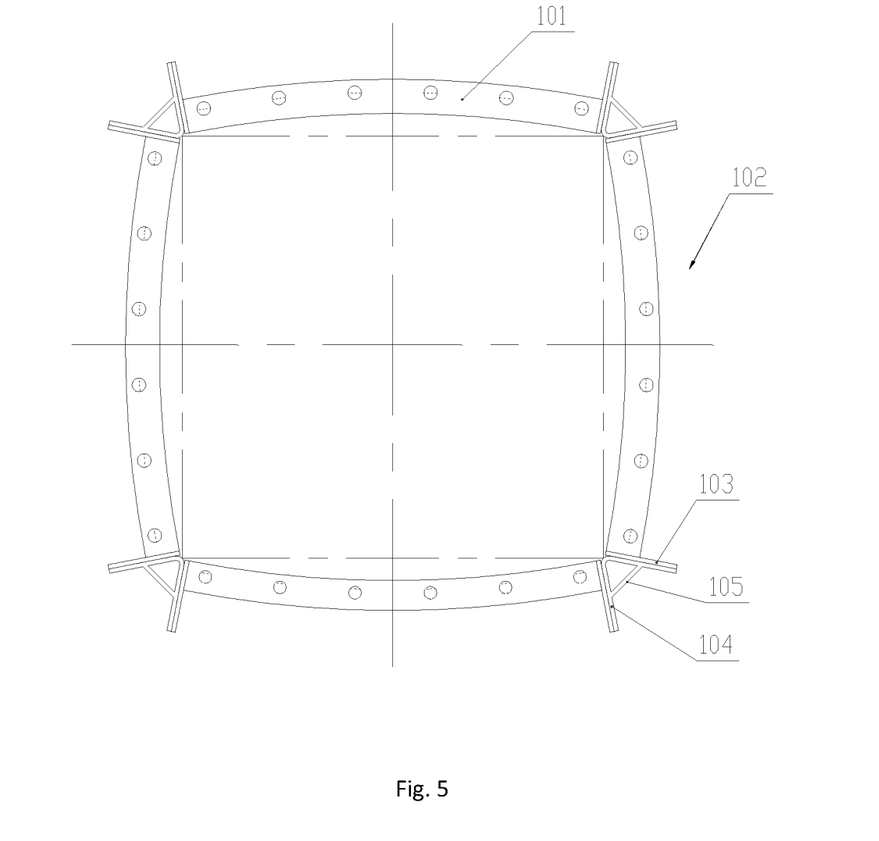
FIG. 5 is a cross-sectional schematic view of a box type duct with a circumferential connection structure according to the present invention.
Figure 9:
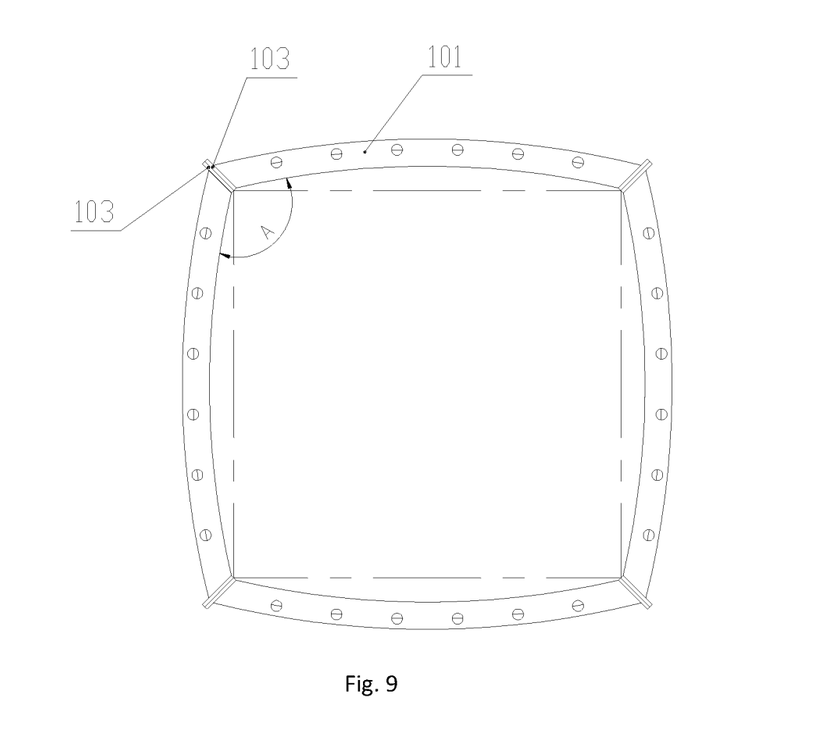
FIG. 9 is a cross-sectional schematic view of FIG. 8.

The cross section of the duct is in an approximately rectangular box shape, so the utilization ratio of clearance of the duct is high, as shown in dotted portions in FIG. 5 and FIG. 9. Since the unit plate adopt an arched corrugated plate of an arc-shaped structure, after backfilling the soil in the gallery, the surrounding backfill can form a good enveloping effect on the gallery; in terms of the overall structural force, the surrounding soil and the duct structure form a whole; and since the plate is arc-shaped in the circumferential direction, the strength and pressure bearing capacity of the overall structure are maximized by utilizing the pipe-soil joint stressing principle.

Figure 4:
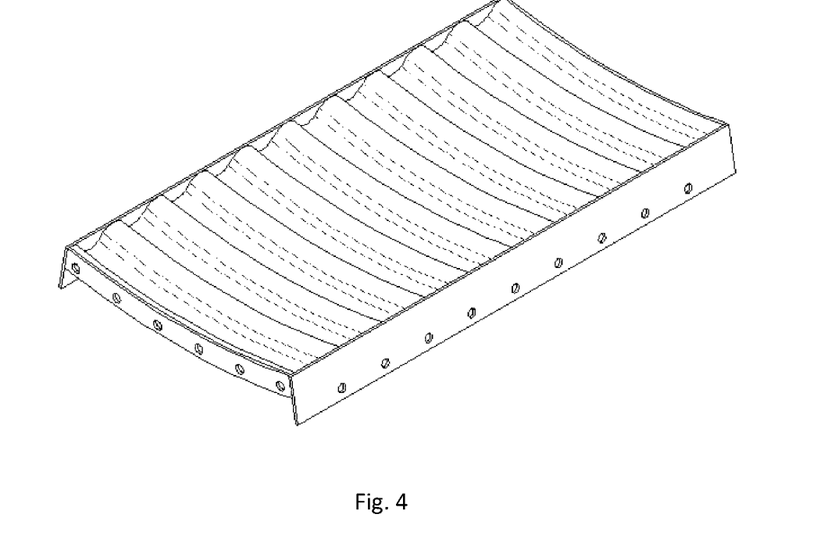
FIG. 4 is a structural schematic view of a unit plate with a circumferential connection structure according to the present invention.

As shown in FIG. 5 and FIG. 6, when the unit plates 101 are spliced in the circumferential direction, the adjacent connecting flanges 103 are connected through a circumferential connection structure, the circumferential connection structure comprises a connecting plate 104 bent at an angle, the bending angle is an acute angle, a reinforcing rib 105 is disposed on the inner side of the connecting plate 104, and a triangular inner cavity is formed between the reinforcing rib 105 and the connecting plate 104. The reinforcing rib makes the overall structure more stable, and the connecting plate can realize a certain positioning function, thereby facilitating the circumferential connection of the adjacent unit plates in the mounting process and implementing quick mounting. The superior pressure bearing capacity of the combination of the acute angle connecting plate and reinforcing rib is utilized to reduce manufacturing costs, implement standardized production, and further enhance the stress strength of the overall structure. As shown in FIG. 4, a contact end of the unit plate 101 is provided with a connecting flange 103, the connecting flange 103 is a flat flange, and the flange face and the corrugated surface of the unit plate are perpendicular to each other, i.e., the flange face is located on the axial line of the arc-shaped unit plate, as shown in FIG. 5.

Figure 1:
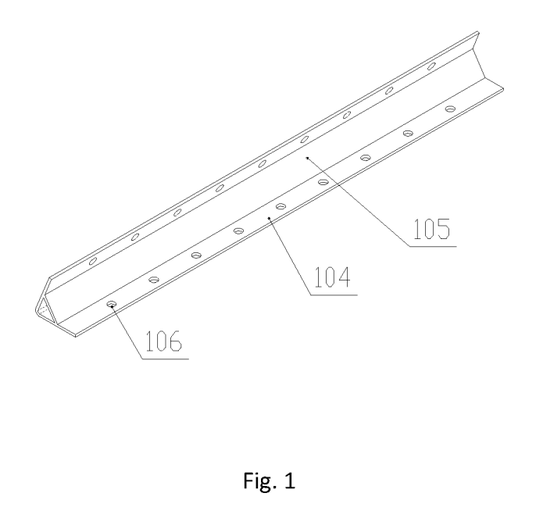
FIG. 1 is a schematic view of a circumferential connection structure without the need for pouring concrete according to the present invention.

As shown in FIG. 1, the connecting plate 104 is provided with connecting holes 106 for circumferential connection, the circumferential splicing surfaces of the unit plate 101 and the connecting flange 103 are provided with circumferential connecting holes, and the circumferential connecting holes and the connecting holes 106 in the connecting plate 103 implement connection between the unit plates through bolts.

Figure 2:
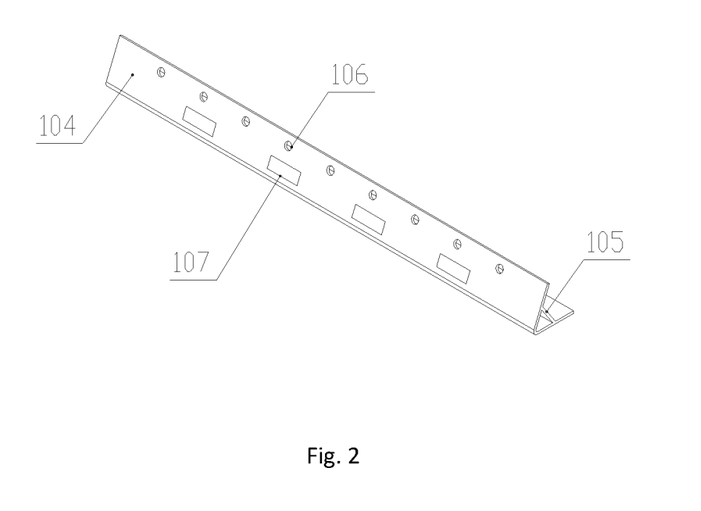
FIG. 2 is a schematic view of a circumferential connection structure with the need for pouring concrete according to the present invention.

As shown in FIG. 2, the connecting plate 104 is provided with circulation holes 107 for pouring concrete. When the concrete needs to be poured after the splicing of the spliced pipe gallery is completed, in order to achieve the communication between the plates and the integrity of the concrete, the connecting plate is provided with circulation holes in the corresponding positions to implement the circulation of the concrete, so that a continuous hollow cavity structure is formed and spliced to form pipe sections, thereby further enhancing the vertical pressure bearing capacity of the pipe gallery.

The inner wall of the unit pipe section 102 is provided with steel bars, embedded parts or hooks, thereby facilitating the arrangement of pipelines or hoses inside in the later period.

Figure 15:
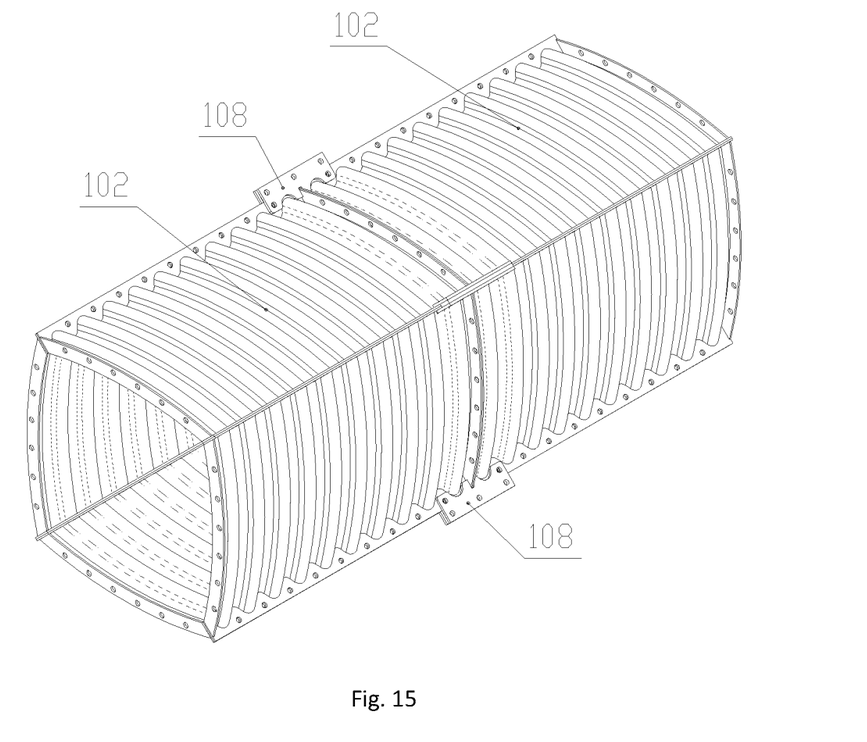
FIG. 15 is a structural schematic view when the unit pipe sections are spliced in the axial direction in the present invention.

As shown in FIG. 15, when the unit pipe sections 102 are spliced in the axial direction, a rigid connection structure spanning adjacent pipe sections is disposed at axial edges of the adjacent unit pipe sections, and the rigid connection structure comprises a pair of fixing plates 108 that are oppositely fastened to the edges of the unit pipe sections. The rigid connection structure may effectively prevent the adjacent units from being deformed or detached by pulling during axial splicing in practical engineering.

The present invention has the following uses: urban underground integrated pipe galleries, culverts, subway tunnels, underground water collecting pipes, water supply pipes or drain pipes, sea water ducts or other ducts conveying special media.

What is claimed is:

1. A box type duct with circumferential obtuse angle connection, wherein that unit plates (101) respectively located on the upper, lower and two side surfaces are spliced in the circumferential direction to form a unit pipe section (102), and the unit pipe sections (102) are spliced in the axial direction to form a box type duct; wherein the unit plate (101) is an arc-shaped corrugated plate arched to the outside of the box type duct, and the adjacent unit plates (101) form an obtuse angle of circumferential connection; wherein contact ends of the adjacent unit plates (101) are provided with connecting flanges (103), and the adjacent connecting flanges (103) are splicing connection surfaces when the unit plates (101) are spliced in the circumferential direction.

2. The box type duct with circumferential obtuse angle connection according to claim 1, wherein that the connecting flange (103) is a flat flange or an angle steel flange.

3. The box type duct with circumferential obtuse angle connection according to claim 2, wherein that the angle steel flange comprises a pair of L-shaped plates, one side surfaces of the pair of L-shaped plates contact each other, and the other side surfaces are respectively connected with the adjacent unit plates (101).

4. The box type duct with circumferential obtuse angle connection according to claim 1, wherein that when the unit plates (101) are spliced in the circumferential direction, the adjacent connecting flanges (103) are connected with each other through a circumferential connection structure, the circumferential connection structure comprises a connecting plate (104) bent at an angle, a reinforcing rib (105) is disposed on the inner side of the connecting plate (104), and a triangular inner cavity is formed between the reinforcing rib (105) and the connecting plate (104).

5. The box type duct with circumferential obtuse angle connection according to claim 4, wherein that the bending angle of the connecting plate (104) is an acute angle.

6. The box type duct with circumferential obtuse angle connection according to claim 4, wherein that the connecting plate (104) is provided with connecting holes (106) for circumferential connection, and the connecting plate (104) and the connecting flange (103) are connected with each other.

7. The box type duct with circumferential obtuse angle connection according to claim 4, wherein that the connecting plate (104) is provided with circulation holes (107) for pouring concrete.

8. The box type duct with circumferential obtuse angle connection according to claim 1, wherein that the unit plates (101) have at least one curvature.

9. The box type duct with circumferential obtuse angle connection according to claim 1, wherein that the corrugated plate is formed by a metal plate, and the metal plate is bent to form protrusions; or the metal plate is bent to form protruded shapes, and a plate or pipe is combined with the protrusions to form a hollow cavity structure; or the corrugated plate is spliced from a metal plate and a metal pipe; or a C-shaped steel, channel steel, I-beam, arc-shaped steel, angle steel or corrugated plate is fastened with the metal plate to form a hollow cavity structure.

10. The box type duct with circumferential obtuse angle connection according to claim 1, wherein that when the unit pipe sections (102) are spliced in the axial direction, a rigid connection structure spanning adjacent pipe sections is disposed at axial edges of the adjacent unit pipe sections (102), and the rigid connection structure comprises a pair of fixing plates (108) that are oppositely fastened to the edges of the unit pipe sections.

* * * * *